United States Patent Office 3,331,959
Patented July 18, 1967

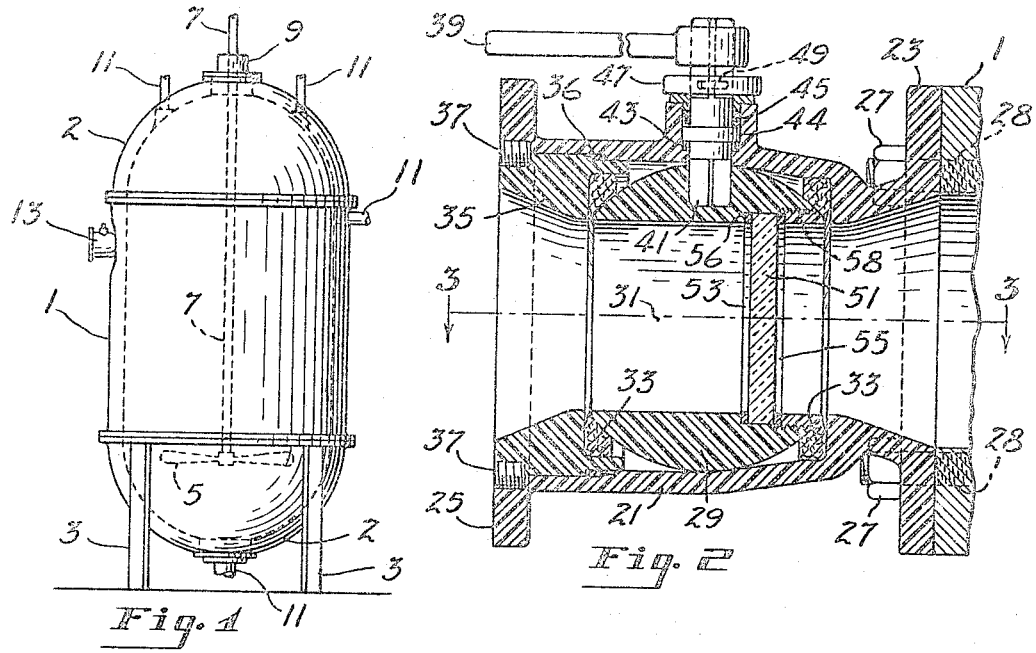

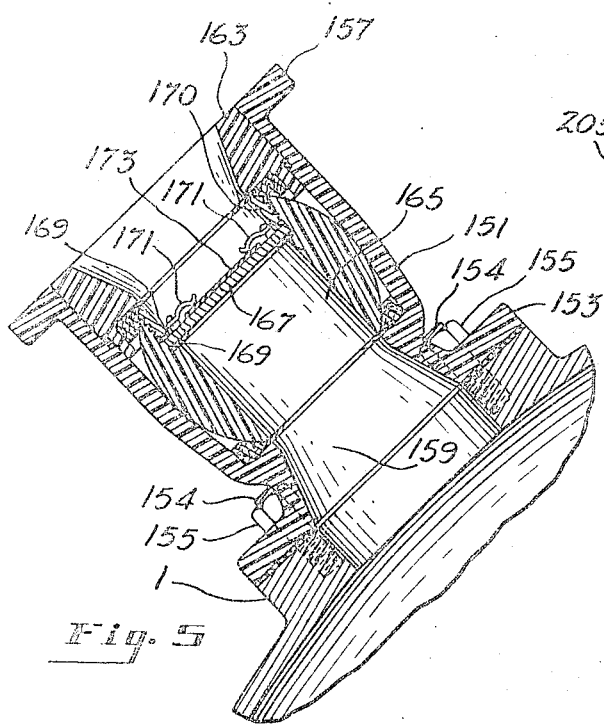
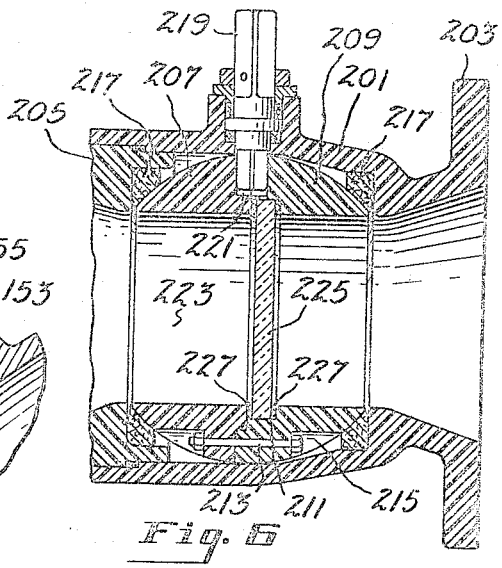
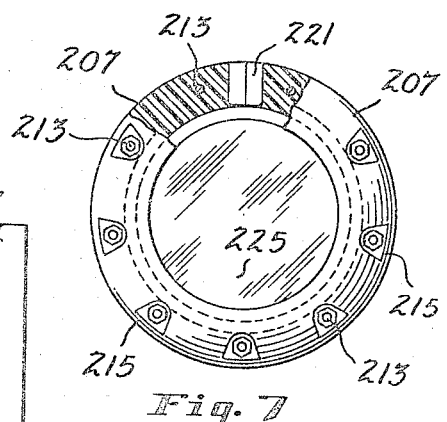
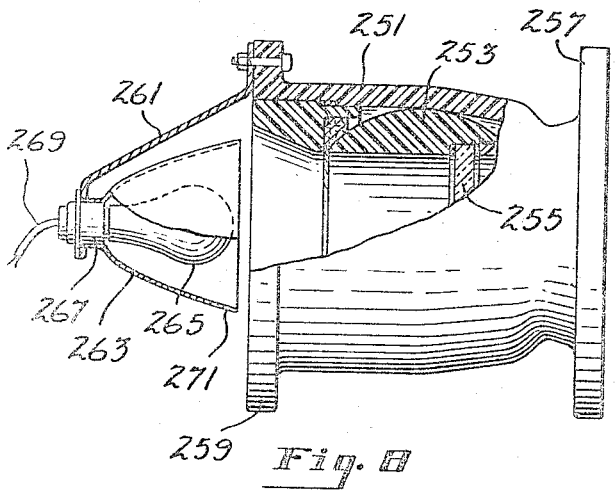

3,331,959
EXPLOSION-PROOF LIGHT ASSEMBLY
Philip R. Sayre, Ashtabula, and Richard W. Watkins, Cuyahoga Falls, Ohio, assignors to The General Tire & Rubber Company, a corporation of Ohio
Filed Aug. 26, 1965, Ser. No. 482,715
12 Claims. (Cl. 240—11.2)

ABSTRACT OF THE DISCLOSURE

A standard ball valve is modified for use as a sight glass on a pressure reactor or the like by the insertion of an appropriate lens system within the ball. This construction has many advantages including ease of cleaning and safety in the event that the sight glass should fracture. The device can also be used, by appropriate modification, to illuminate or photograph the interior of a vessel or to introduce, remove or expose small quantities of material, film or the like to said interior.

---

This invention relates to a modification of a typical ball valve assembly of the type used in a piping system or in connection with an enclosed reactor or vessel. More particularly, this invention relates to a ball valve modified by positioning an insert within the ball to block off the annular passage therethrough, thus rendering the ball valve suitable for a variety of purposes, dependent upon the characteristics of the insert. Yet more specifically, the invention relates to a ball valve which is modified to make it useful for any number of purposes such as an observation sight glass, a source of illumination, means for introducing additives to a reactor or vessel, or for removing samples therefrom, or means for exposing test samples to the interior of a reactor.

In the chemical industry, many reactions are carried out in large enclosed reactors under an infinite variety of conditions. The temperatures and pressures within the reactor, as well as the types and proportions of the ingredients therein, are subject to wide variation. The reactor vessel may be agitated or not, as desired. In many types of reactions, it is advantageous to be able to see into the vessel to observe the process of the reaction going on therein, or to measure the temperatures within the reactor using a pyrometer or the like. At other times, it is necessary to be able to add small amounts of materials, such as minor ingredients, catalysts, or trace minerals to the vessel during the course of the reaction. Of frequent necessity is the testing of the interior of the reactor to determine the pH, pressure, or progress of the reaction.

In general, deactors have been provided with sight glasses for many years, said sight glasses being clamped between two flanges, one of which is mounted on the reactor and is in communication with the inside thereof. In this type of arrangement, one face of the glass is constantly exposed to the interior of the reactor, and as a result, especially where the reactants are highly corrosive or tend to foam, this face becomes dirty or clouded thus impairing the view of the observer. With this type of installation the inside surface of the sight glass cannot be cleaned without first shutting down the reactor and disassembling the sight glass assembly. More important, however, is the fact that if the glass should break and the reactor is under pressure, there is no way of containing the contents of the vessel. In fact, some violent explosions have been attributed to the fracture of an observation glass on a pressure reactor containing combustible or highly explosive ingredients.

One object of this invention is to provide a reactor sight glass assembly having safety features heretofore unavailable.

Another object is the modification of a ball valve in such a manner as to make it useful as a sight glass or for other purposes.

It is another object to produce a sight glass by sectioning the ball of a ball valve and placing a transparent disc in between the sections, transverse to and blocking the passageway through said ball.

These and other objects are accomplished in a manner to be hereinafter described, the description being exemplified by reference to the drawings in which:

FIGURE 1 represents a reactor, or the like, with a sight glass assembly mounted thereon;

FIGURE 2 is an enlarged vertical section through the sight glass assembly shown in FIGURE 1;

FIGURE 3 is a sectional view taken along line 3—3 of FIGURE 2 but with the ball rotated through an angle of 90° with respect to its position in FIGURE 2;

FIGURE 4 is a cross-sectional view showing the use of a lens system in the ball valve assembly;

FIGURE 5 shows another modification wherein clamps are provided for holding test film or the like to be exposed to the interior of the reactor;

FIGURE 6 shows a modified means of securing the sight glass or the like in the passageway of the rotatable element;

FIGURE 7 is an elevational view of the rotatable element as shown in FIGURE 6 with parts broken away for purposes of clarification;

FIGURE 8 shows a further modification which may be used to illuminate the interior of a reactor.

Referring now to FIGURE 1, there is shown a reactor vessel 1 of generally cylindrical shape with dished ends 2 mounted in the vertical position on suitable support members 3. Within the vessel is an agitator 5 connected to a rotatable shaft 7 passing through a rotary seal 9 in the top of the reactor. A plurality of pipes 11 communicate with the interior of the vessel and are adapted to be connected to material feed lines, product withdrawal means, vent means, or the like. Mounted on the side of the reactor is a novel sight glass assembly 13 to be hereinafter described in more detail. The sight glass is shown for illustration purposes mounted on the side of the reactor. It should be understood, however, that the sight glass can be used with storage containers, tank cars, nuclear reactors, and the like, its use not being limited to a chemical reactor or to a tank, vessel, or column as distinct from a pipe.

In FIGURES 2 and 3 are shown the details of the sight glass assembly 13 of FIGURE 1. For simplicity, identical numbers will be used in each figure to refer to the corresponding parts. The ball valve consists of a valve body 21 terminating in two flanges 23 and 25. The flange 23 is connected to the reactor 1 by suitable means such as bolts 27 threaded onto studs 28 anchored in the wall of the reactor. Alternatively, it is obvious that the ball valve can be threaded into, welded, or otherwise connected to the reactor in which case one or both of the flanges would be dispensed with.

Sealed within the body of the valve is a ball valve 29 provided with an annular passageway 31 therethrough. Two annular valve seats 33 of well-known construction maintain the position of the ball 29 within the body 21. These seats are typically composed of a low friction material such as Teflon which is resistant to environmental conditions and which can be readily machined to conform to the contour of the ball, thus permitting ready rotation of the ball within the valve body. The ball is held in place by a body cap 35 inserted into the passageway of the valve and locked into position by small insert screws 37. An "O" ring 36 or other suitable packing material serves to maintain a fluid-tight connection between the valve body 21 and the body cap 35.

A handle 39 communicates with the ball 29 through square stem 41 inserted into a conforming recess in the spherical surface of the ball. The stem passes through a stem seal 43 and a stem bearing 45 separated from one another by a stem flange 44. A stop indicator 47 is attached to the stem by pin 49.

Within the annular passage 31 of the ball valve is incorporated the sight glass 51 of this invention. The diameter of the sight glass is slightly larger than the normal diameter of the passageway. In order to accommodate the sight glass, one end of the passageway is suitably machined to a diameter large enough to receive the sight glass. A shoulder 56 is formed within the ball at the juncture between the normal passageway and the enlarged portion. The enlarged passageway is suitably threaded, and an annular lock ring 58 is provided with conforming threads on its exterior surface. The sight glass, sandwiched between a first gasket 53 abutting the aforementioned shoulder 56 and the second gasket 55, is inserted into the passageway after which the lock ring 58 is threaded into the passageway to hold the sight glass in place. The two gaskets 53, 55 absorb the compression when the lock ring is tightened into place, thereby limiting the possibility of cracking or chipping the peripheral portion of the sight glass.

As seen in FIGURE 2, the ball has been rotated into a position whereby an observer can look into the interior of the reactor 1. As seen in the figure, the thickness of the sight glass 51 can be readily varied, depending upon the conditions of use. When the sight glass assembly is to be attached to a high-pressure reactor, the glass can be made much thicker than when used on a low pressure reactor.

It is contemplated that many types of glass, including Pyrex and quartz, can be used for the sight glass used in this modified ball valve assembly. The sight glass can be held within the ball by means other than those shown in FIGURE 2; for instance, as shown in FIGURES 6 and 7 to be subsequently explained in more detail.

FIGURE 3 shows the sight glass in its normally closed position. When in this position, the sight glass is not exposed to the environmental conditions within the reactor. The glass is rotated 90° to the viewing position (FIGURE 2) only when it is necessary to make an observation. If the glass should break when in the viewing position, the valve can be quickly and completely closed off as shown in FIGURE 3 until such time as the reactor is shut down whereupon the valve can be disassembled and the sight glass replaced.

A further important advantage, providing the valve stem does not have stops which limit its rotational movement to 90°, is the fact that the ball 29 can be rotated 180° to permit cleaning of the surface of the sight glass after it had been exposed to the interior of the reactor.

In FIGURE 4 is shown one variation of the invention wherein the simple sight glass is replaced by a lens system, wherein it is necessary or desirable to make observations through a wider angle, or to magnify the object sought to be observed. In this figure is seen a valve body 101 terminating in a flange 103 adapted to be bolted or otherwise secured to a reactor, container, vessel, etc. Seated within two valve seats 105 is a ball 107 with an annular passageway 109 extending therethrough. A body cap 111 serves to retain the ball in place. Mounted within the passageway 109 is an annular disc 115 held securely in place between two gaskets 117 by an annular lock ring 119 threaded into the enlarged portion of the passageway 109. Secured to said disc 115 by suitable means is a plastic or metal lens holder 121. Disposed within said holder are two convex lens 123 and a flat lens 125. It is obvious that the optical effect to be desired, as well as the dimensions of the ball valve, will determine the optical characteristics, size, number, and shape of the lens to be used in the assembly, and that the number and arrangement of the lenses shown in the figure are illustrative only.

This lens system is operable in a manner similar to that described in connection with the singular sight glass. The ball is connected to a suitable valve handle which can be rotated to pivot the passageway 109 of the valve into alignment with the passage through the body of the valve, thus permitting the viewer to observe the interior of the reactor. When not in use, the ball is rotated 90° to a position where the lens system is out of contact with the passage and is therefore out of communication with the interior of the reactor.

FIGURE 5 shows yet another modification of this invention wherein the valve assembly can be used to expose film strips, Litmus paper, or other similar material to the interior of the reactor, generally for the purpose of analyzing the contents thereof. The ball valve similar in construction to the ones heretofore described consist of a body 151 having a first flange 153 adapted to be bolted to studs 154 on reactor 1 by bolts 155, and a second flange 157 at the other end. A passageway 159 through the valve body 151 communicates with the interior of the reactor. An annular ball 161 is seated within the body of the valve, and is held there by a valve cap 163. Positioned within the ball 161 and dividing the annulus through the ball into two separate chambers is a disc 167 with an annular gasket 169 positioned on either side of said disc. An annular threaded lock nut 170 is threaded into the enlarged portion of the passageway through the ball to retain the disc 167 in place. Two clips 171 riveted or otherwise attached to the disc are shown holding a test specimen 173 such as a piece of unexposed film or the like. The number, size, and placement of said clips are immaterial for purposes of the invention. To expose the film the ball is rotated 180°, thus bringing the film 173 into direct contact with the interior of the reactor. Upon expiration of the exposure time, the ball is again rotated 180° to return the film to a position where it can be readily removed and examined or developed.

The disc 167 can be made from metal, lead, or other suitable material if the valve assembly is going to be used solely for purposes of exposing materials to the interior of the reactor. However, it is obvious that the disc can be similar in nature to the transparent sight glass as hereinbefore described, but with clips around the peripheral portion thereof. In this manner, the assembly can serve a two-fold function for making visual observations, or alternatively for exposing film or the like.

Referring now to FIGURES 6 and 7, there is shown another method for installing the sight glass or disc into the ball of the valve. The various valve components, including the body 201, flange 203, and cap 205, have been previously explained in some detail. The ball 209, however, including the method for retaining the sight glass within the ball, are different. This ball is composed of two sections 207, 211 of approximately equal size. The two sections are held together by a plurality of bolts 213. The peripheral portions of these two sections are relieved to provide a plurality of recesses 215 adapted to receive the bolts 213 so that they do not interrupt the seating of the ball 209 within the valve seats 217. The square valve stem 219 fits into a corresponding hole 221 in the ball. The juncture between the two sections 207, 211 of the ball contains a groove. Into this groove is inserted a sight glass 225 supported on either side by suitable gaskets 227. The two sections are then bolted together around their periphery. This type of construction can be used in place of a threaded lock nut as previously described where a more rugged assembly is necessary or desirable for holding the reactor sight glass in position.

FIGURE 8 shows an explosion-proof light assembly attached to this novel valve to provide illumination for the interior of the vessel. This type of assembly would ordinarily be used in conjunction with another valve used for purposes of observation. In this figure the ball valve having a body 251 and a ball 253 is provided with a glass 255 installed within the ball according to any of the previously described methods. A first flange 257 is adapted to be bolted or otherwise connected to the reactor. Attached to the other flange 259 by a bracket 261 bolted thereto is an explosion-proof light assembly 263 comprising a light bulb 265 threaded into socket 267 which is in turn connected by wires 269 to a suitable source of electric current. Hood 271 serves to protect the light bulb from accidental breakage. Illuminating the interior of a reactor by this means has the advantage that the safety features as previously described for this valve assembly are likewise applicable thereto. Accordingly, in case of accidental breakage of the sight glass 255, the ball can be rotated so as to close off the valve. Furthermore, the sight glass can be easily cleaned by merely rotating the light assembly 263 away from the passageway body 251 and pivoting the ball 253 180° from the position as shown in FIGURE 8 thereby permitting access to the surface of the sight glass 255 which had been exposed to the interior of the reactor. When not in use, the sight glass is in the normally closed position.

It should be understood that the various components of the valve can be made out of any suitable material including, but not limited, to cast iron, aluminum, plastic, and lead. Likewise, the lens, sight glass, or disc can be made from a wide variety of materials having the optimum properties for a given set of conditions. For instance, the material can be highly refractory, highly resistant to chemical attack, or can be made to resist extremely high pressures. In addition, the optical properties of the sight glass or the lenses can be varied to suit specific needs. When used in conjunction with nuclear reactors, effective shielding must be provided and other safety precautions observed.

As a further modification of this invention, the novel ball valve assembly can be provided with means for introducing small amounts of material to a reactor vessel. Normally, if used for this purpose, the assembly is mounted on or near the top of the vessel so that upon rotation of the valve the additives will be introduced by gravity flow. A small container or capsule is attached to the disc by suitable means and additives are placed in the container or capsule which, when the ball is rotated, will allow the contents thereof to fall into the reactor.

Furthermore, the ball valve assembly can be used to withdraw samples of vapor, liquid, or solids from within a reactor, while utilizing all of the advantages and safety features that have heretofore been described.

Further modifications and variations can be made in the construction and design of the ball valve, the sectioned ball, as well as the size and shape of the insert within the ball without departing from the novel concept embodied herein, which is delimited only by the following claims in which:

1. A ball valve assembly containing a ball and a valve stem attached thereto, said ball having an annular passage therethrough, said passage having a first portion of fixed diameter, a second portion of larger diameter and a shoulder formed at the intersection of the first and second portions, a solid insert of larger diameter than said first portion of said passage positioned against said shoulder, and an annular ring threaded into the second portion of said passage to retain said insert against said shoulder.

2. A sight glass assembly for pressure vessels comprising a valve body having an outlet communicating with the interior of the vessel, a ball seated within said body and having an annular passage therein, a transparent disc sealed within said annular passage, and means to rotate said ball to align said annular passage with said outlet.

3. An explosion-proof light assembly for illuminating the interior of vessels comprising a valve body having an inlet and an outlet, a source of light communicating with said inlet, the outlet communicating with the interior of the vessl, a ball seated within said body and having an annular passage therein, a transparent disc disposed within said passage and normal thereto, and means to rotate said ball to align said passage with the source of light and with the vessel.

4. A means for sampling the contents of a vessel comprising a ball valve having a body communicating with the interior of the vessel, a ball seated within said body and having an annular passage therethrough, an insert located within said passage normal thereto dividing the passage into two separate chambers, and means for rotating said ball to position one of said chambers alternately in communication with the interior of the vessel and then remote from said vessel.

5. Means according to claim 4 wherein the chamber is adapted to receive a sample of the contents of the vessel and, upon rotation of the ball, to remove the sample from the reactor.

6. Means according to claim 4 wherein one of the chambers is adapted to hold testing means to be exposed to the interior of the vessel.

7. A ball valve assembly for introducing incremental amounts of material into a reactor comprising a body having an inlet and an outlet, said outlet communicating with the interior of the reactor, a ball seated within said body and having an annular passageway therein, means to rotate said ball into and out of alignment with said inlet and outlets, an insert disposed within said passageway and dividing the same into two closed chambers, and means in one of said chambers for holding the material to be added while the ball is rotated to move the chamber containing the sample from the inlet position to the outlet position.

8. A ball valve assembly comprising a valve body having aligned inlet and outlet passages and provided with a ball seat therebetween, a ball seated within said body and having an annular passage extending therethrough, and means for rotating said ball from a first position wherein said annular passage is in alignment with said inlet and said outlet passages to a second position wherein said annular passage is completely out of communication with said other passages, the improvement comprising an impermeable disc mounted within said annular passage, completely blocking the same.

9. A ball valve assembly containing a ball with an annular passage therethrough, an abutment-forming shoulder within said passage, an impermeable, transparent insert abutting against said shoulder, means for retaining said insert against said shoulder and means for rotating said ball.

10. The ball valve assembly containing a ball with an annular passage therethrough, an abutment-forming shoulder within said passage, an impermeable insert abutting against said shoulder, means for retaining said insert against said shoulder comprising an annular ring threaded into said annular passage and means for rotating said ball.

11. A ball valve assembly containing a ball with an annular passage therethrough, an abutment-forming shoulder within said passage, an impermeable disc abutting against said shoulder, said disc provided with clips, means for retaining said insert against said shoulder, and means for rotating said ball.

12. The assembly according to claim 11 wherein said disc is transparent.

References Cited

UNITED STATES PATENTS

| 386,547 | 7/1888 | Martin | 285—91 XR |
| 3,125,882 | 3/1964 | Johnson et al. | 73—331 |

FOREIGN PATENTS 198,370  6/1958  Austria.

NORTON ANSHER, *Primary Examiner.*

W. M. FRYE, *Assistant Examiner.*